(12) United States Patent
Xu et al.

(10) Patent No.: US 11,616,446 B1
(45) Date of Patent: Mar. 28, 2023

(54) POWER SUPPLY HAVING A RESONANT TOPOLOGY, METHOD OF OPERATING A POWER SUPPLY HAVING A RESONANT TOPOLOGY AND APPARATUS

(71) Applicant: Flex Ltd., Singapore (SG)

(72) Inventors: Hua Min Xu, Shenzhen (CN); Weian Chen, Shenzhen (CN); Xiao Dong Liu, Shenzhen (CN); Yi Zhang, Shenzhen (CN)

(73) Assignee: Flex Ltd., Singapore (SG)

( * ) Notice: Subject to any disclaimer, the term of this patent is extended or adjusted under 35 U.S.C. 154(b) by 5 days.

(21) Appl. No.: 17/479,561

(22) Filed: Sep. 20, 2021

(30) Foreign Application Priority Data

Sep. 14, 2021 (CN) .......................... 202111072418.X

(51) Int. Cl.
*H02M 3/335* (2006.01)
*H02M 3/00* (2006.01)

(52) U.S. Cl.
CPC ......... *H02M 3/33507* (2013.01); *H02M 3/01* (2021.05)

(58) Field of Classification Search
None
See application file for complete search history.

(56) References Cited

U.S. PATENT DOCUMENTS

| | | | |
|---|---|---|---|
| 9,425,694 B2 * | 8/2016 | Matsuura | H02M 3/33592 |
| 10,424,936 B2 * | 9/2019 | Garrity | H02M 5/458 |
| 10,797,607 B2 * | 10/2020 | Rainer | H02M 3/33523 |
| 11,336,189 B2 * | 5/2022 | Parsa | H02M 3/01 |
| 2022/0060120 A1 * | 2/2022 | Jaksa | H02M 1/0058 |

* cited by examiner

*Primary Examiner* — Jeffrey A Gblende
(74) *Attorney, Agent, or Firm* — Sheridan Ross P.C.

(57) ABSTRACT

An apparatus includes a switching circuit, a resonant circuit coupled to an output of the switching circuit, a rectification circuit coupled between the resonant circuit and an output of the apparatus, and a controller coupled to the switching circuit. The controller, during a soft start-up operation of the power supply, is configured to switch a plurality of switches with a variable limited maximum duty cycle at a minimum frequency and after the variable limited maximum duty cycle reaches the limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency.

20 Claims, 13 Drawing Sheets

US 11,616,446 B1

POWER SUPPLY HAVING A RESONANT TOPOLOGY, METHOD OF OPERATING A POWER SUPPLY HAVING A RESONANT TOPOLOGY AND APPARATUS

CROSS REFERENCE TO RELATED APPLICATIONS

This application is a national stage application under 35 U.S.C. 371 and claims the benefit of Chinese Patent Application No. 202111072418.X filed 14 Sep. 2021, the entire disclosures of each of which are incorporated herein by reference.

FIELD

The present disclosure is generally directed to power supplies incorporating resonant topologies and more particularly to an improved soft start-up operation for the power supplies incorporating the resonant topologies to eliminate metal-oxide-semiconductor field-effect transistor (MOSFET) hard switching of a body diode with inverse recovery current while achieving a controllable monotonic rising slope of the output voltage.

BACKGROUND

Power supplies can have various power converter configurations. The power converters are used in a variety of applications to convert and/or condition power from an input source to provide a desired output voltage and output current. While there are many types of power converters, the switching power converter is currently in widespread use. Switching power converters include at least one switch, which is used to selectively deliver power from an input source to one or more additional components therein to provide a desired output voltage and output current. Control circuitry for the switching power converter provides control signals to the one or more switches to change the output voltage, the output current or both.

A resonant power converter provides efficient power solutions for power supply designs. A resonant power converter is a type of power converter that provides direct current to direct current (DC-DC) conversion, as well as DC to alternating current (AC) conversion, based on the resonant current oscillation at a specific frequency. A switching resonant power converter contains one or more switching elements (e.g., one or more MOSFETS) and reactive elements (e.g., capacitors and inductors) that, in connection with a periodic switching of the switching elements, generates a sinusoidal voltage or current. This voltage may then be rectified to produce a stable output voltage. Types of switching resonant power converters include a series resonant power converter, a parallel resonant power converter, and a series-parallel resonant power converter.

Shortcomings of the switching resonant power converters exist during a soft start-up operation. During the soft start-up operation using the pulse-width modulation (PWM) mode, there are certain PWM duty cycle ranges that cause the MOSFET to operate in a hard switching mode with a body diode inverse recovery current. When the conventional frequency modulation control is used during the soft start-up operation, power losses are generated due to the high frequencies used. Moreover, frequency modulation control during the soft start-up operation is also not easy to implement because of the requirement of an expensive controller. When the conventional duty cycle modulation control is used during the soft start-up operation, the inverse recovery current from the MOSFET's intrinsic body diode interferes with the soft start-up operation and/or causes damage to the components of the switching resonant power converter. Therefore, the MOSFET's intrinsic body diode must have a very low inverse current recovery time when switching the MOSFET from low to high (and vice versa) in order to avoid a hard switching condition. MOSFET body diodes that exhibit fast inverse current recovery, however, are very expensive.

Accordingly, what is needed is a system and method for effectively implementing the soft start-up operation of a power supply while avoiding the drawbacks of frequency modulation control and duty cycle modulation control, without adding considerable power loss, damage to components, solution size, cost and complexity.

Figure 1:
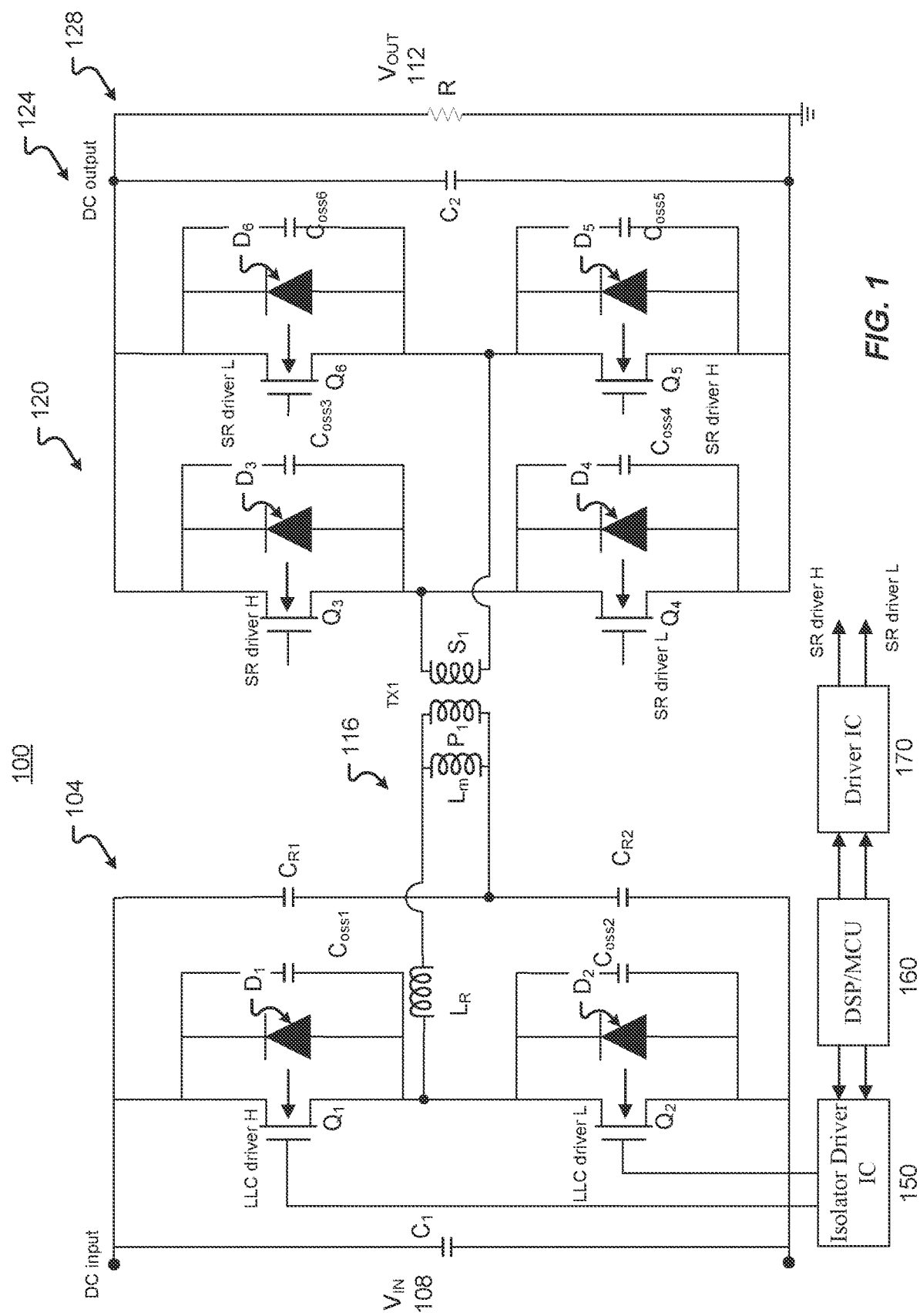
FIG. 1 is a circuit diagram representing a schematic configuration of a power supply incorporating an inductor-inductor-capacitor (LLC) topology requiring a controllable monotonic rising slope of the output voltage while preventing MOSFET hard switching of a body diode with inverse recovery current according to one embodiment of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

At least one example embodiment is directed to a power supply having a resonant topology. The power supply incudes a switching circuit, a resonant circuit, a rectification circuit and a controller. The switching circuit including a plurality of switches, an input and an output. The input is coupled to an input voltage source. The resonant circuit is coupled between the output of the switching circuit. The rectification circuit is coupled between the resonant circuit and an output of the power supply. The controller is coupled to the switching circuit and configured to, during a soft start-up operation of the power supply, switch the plurality of switches with a duty cycle of a variable limited maximum duty cycle at a frequency of a minimum frequency in a pulse frequency modulation (PWM) mode. The controller is further configured to, after the variable limited maximum duty cycle reaches the limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The controller is further configured to, after the duty cycle at the maximum frequency reaches a value of 0.5, enter a pulse frequency modulation (PFM) mode.

At least one example embodiment is directed to a method of operating a power supply having a resonant topology. The method includes determining a minimum frequency for a frequency and a limited maximum duty cycle for a variable duty cycle at which to provide drive signals in response to a feedback signal in a pulse width modulation (PWM) mode. The method also includes, after the limited maximum duty cycle has been reaches at the minimum frequency, simultaneously switching the frequency to a maximum frequency and switching the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The method further includes after the duty cycle at the maximum frequency reaches a value of 0.5, enter a pulse frequency modulation (PFM) mode.

At least one example embodiment is directed to an apparatus. The apparatus includes a switching circuit, a resonant circuit coupled to an output of the switching circuit, a rectification circuit coupled between the resonant circuit and an output of the apparatus and a controller. The controller is coupled to the switching circuit and is configured to, during a soft start-up operation of the power supply, switch a plurality of switches of the switch circuit with a duty cycle of a variable limited maximum duty cycle at a frequency of a minimum frequency in a pulse frequency modulation (PWM) mode. The controller is also configured to, after the variable limited maximum duty cycle reaches the limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The controller is further configured to, after the duty cycle at the maximum frequency reaches a value of 0.5, enter a pulse frequency modulation (PFM) mode.

The subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the subject matter nay be practiced without these specific details. In other instances, well-known structures and devices are shown in block diagram form in order to facilitate describing the subject innovation.

Moreover, the word "exemplary" is used herein to mean serving as an example, instance, or illustration. Any aspect or design described herein as "exemplary" is not necessarily to be construed as preferred or advantageous over other aspects or designs. Rather, use of the word "exemplary" is intended to present concepts in a concrete fashion. As used in this application, the term "or" is intended to mean an inclusive "or" rather than an exclusive "or" That is, unless specified otherwise, or clear from context, "X employs A or B" is intended to mean any of the natural inclusive permutations. That is, if X employs A, X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In addition, the word "coupled" is used herein to mean direct or indirect electrical or mechanical coupling.

The term "converter," as used herein, encompasses but is not limited to any one of, or any combination of "regulator," "DC regulator," "AC regulator, "voltage regulator," "DC voltage regulator," DC-DC converter," "DC-AC converter," "DC converter" and "converter," and includes, but is not limited to, the plain meaning of any of these terms.

Figure 2A:
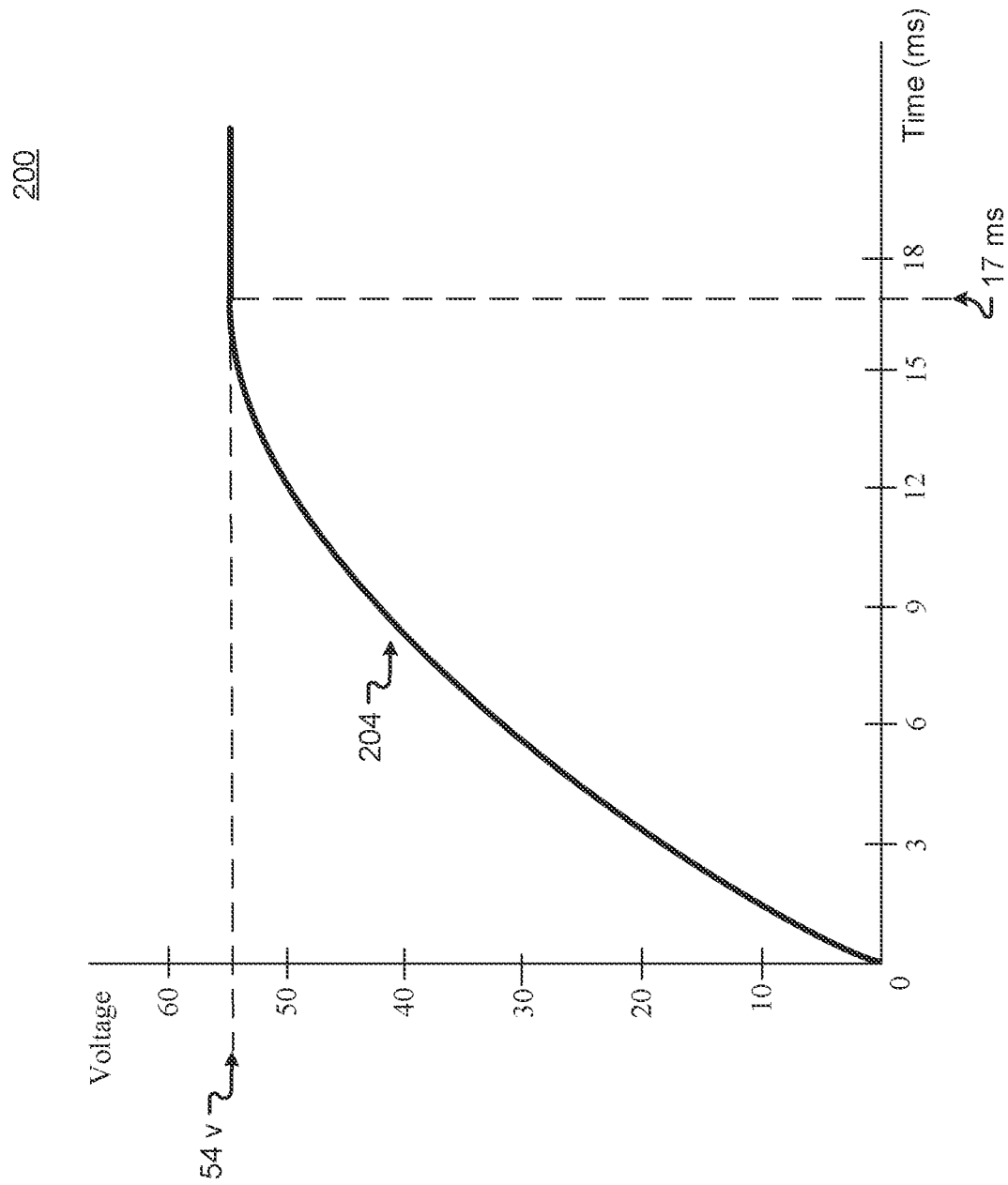
FIG. 2A is a graph of an exemplary waveform of the output voltage for a power supply employing conventional frequency modulation control during the soft start-up operation.

Conventionally, there are two techniques for the soft start-up operation of an inductor-inductor-capacitor (LLC) resonant converter. A first technique can be described as frequency modulation control. In frequency modulation control, an extremely high frequency (e.g., greater than 300 kHz) is used for the soft start-up operation and the LLC resonant converter operates with a low output reference voltage. Frequency modulation control achieves a good monotonic increase in the output voltage, but the rising slope of the output voltage varies greatly during the entire soft start-up operation. A high-performance controller and complicated circuit designs are, however, required for frequency modulation control of the LLC resonant converter during the soft start-up operation. FIG. 2A is a graph 200 of an exemplary waveform 204 of the output voltage for an LLC resonant converter employing conventional frequency modulation control during the soft start-up operation. The horizontal axis of the graph 200 denotes the time in milliseconds (ms) and the vertical axis of the graph 200 denotes the voltage in volts (V). The waveform 204 of the output voltage starts at 0 V and increases to 54V in 17 ms. This sharp rise in the output voltage over a short period of time generates significant power losses for the LLC resonant converter.

Figure 2B:
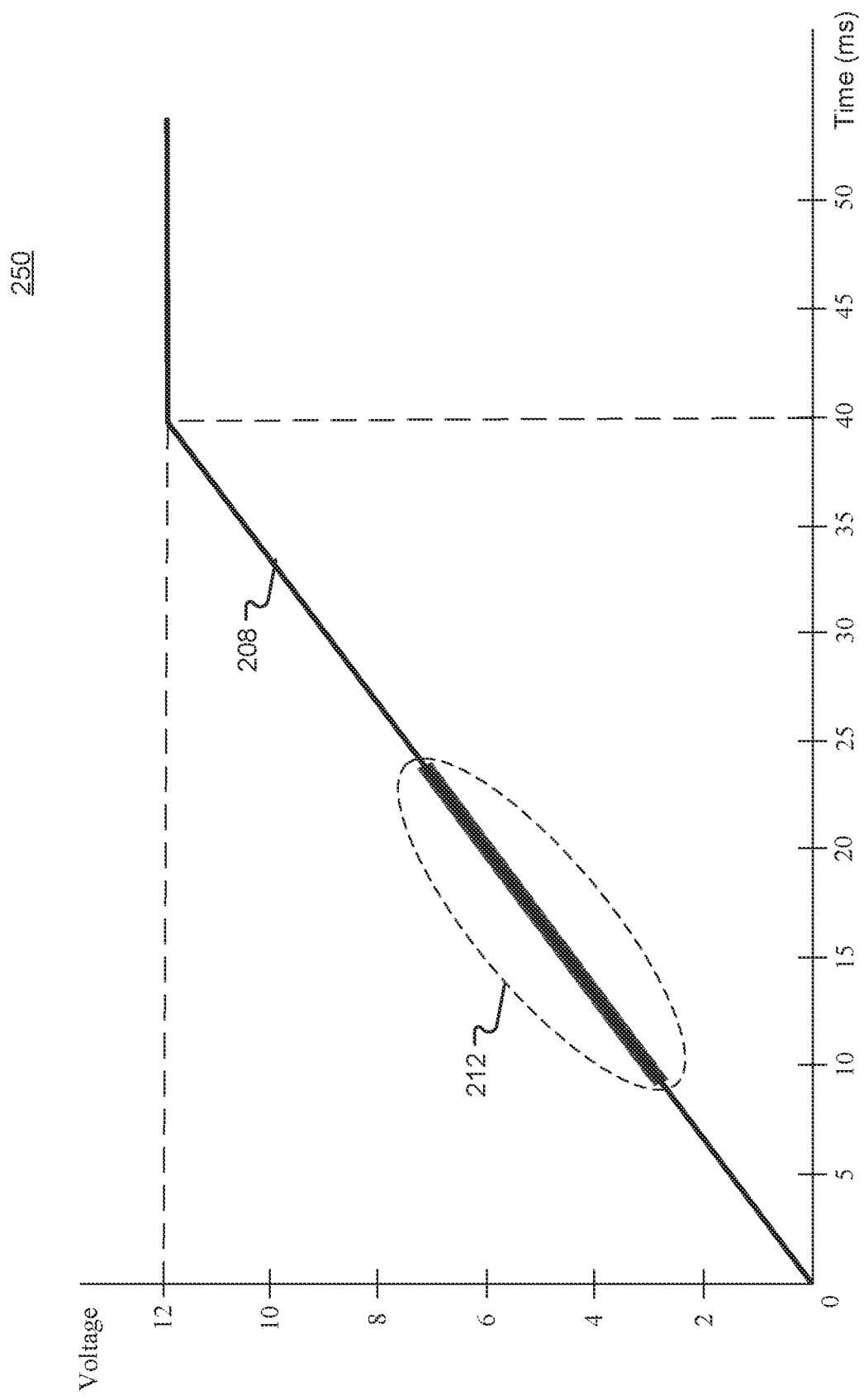
FIG. 2B is a graph of an exemplary waveform of the output voltage for a power supply employing conventional duty cycle modulation control during the soft start-up operation.

Another technique for the soft start-up operation can be described as duty cycle modulation control. With duty cycle modulation control, the overall constant rising slope of the output voltage is achieved, but at a price. This technique causes hard switching of a body diode of the MOSFET that will require a high performance MOSFET. During the soft start-up operation, the pulse-width modulation (PWM) mode starts from a 0% duty to a 50% duty and then enters the pulse frequency modulation (PFM) mode. Depending on the circuit design, there will be certain PWM duty cycle ranges that cause hard switching of the body diode of the MOSFET. This requires more expensive MOSFETs to be used. FIG. 2B is a graph 250 of an exemplary waveform 208 of the output voltage for an LLC resonant converter employing conventional duty cycle modulation control during the soft start-up operation. The horizontal axis of the graph 250 denotes the time in milliseconds (ms) and the vertical axis of the graph 250 denotes the voltage in volts (V). The waveform 208 of the output voltage starts at 0 V and increases to 12V in 40 ms. With the conventional duty cycle modulation control, the overall constant rising slope of the output voltage is achieved, but hard switching occurs since there is too much energy being generated in the resonant tank and not to the outside. This hard switching at certain duty cycle ranges is illustrated by the hard switching internal energy encircled by 212.

Figure 3:
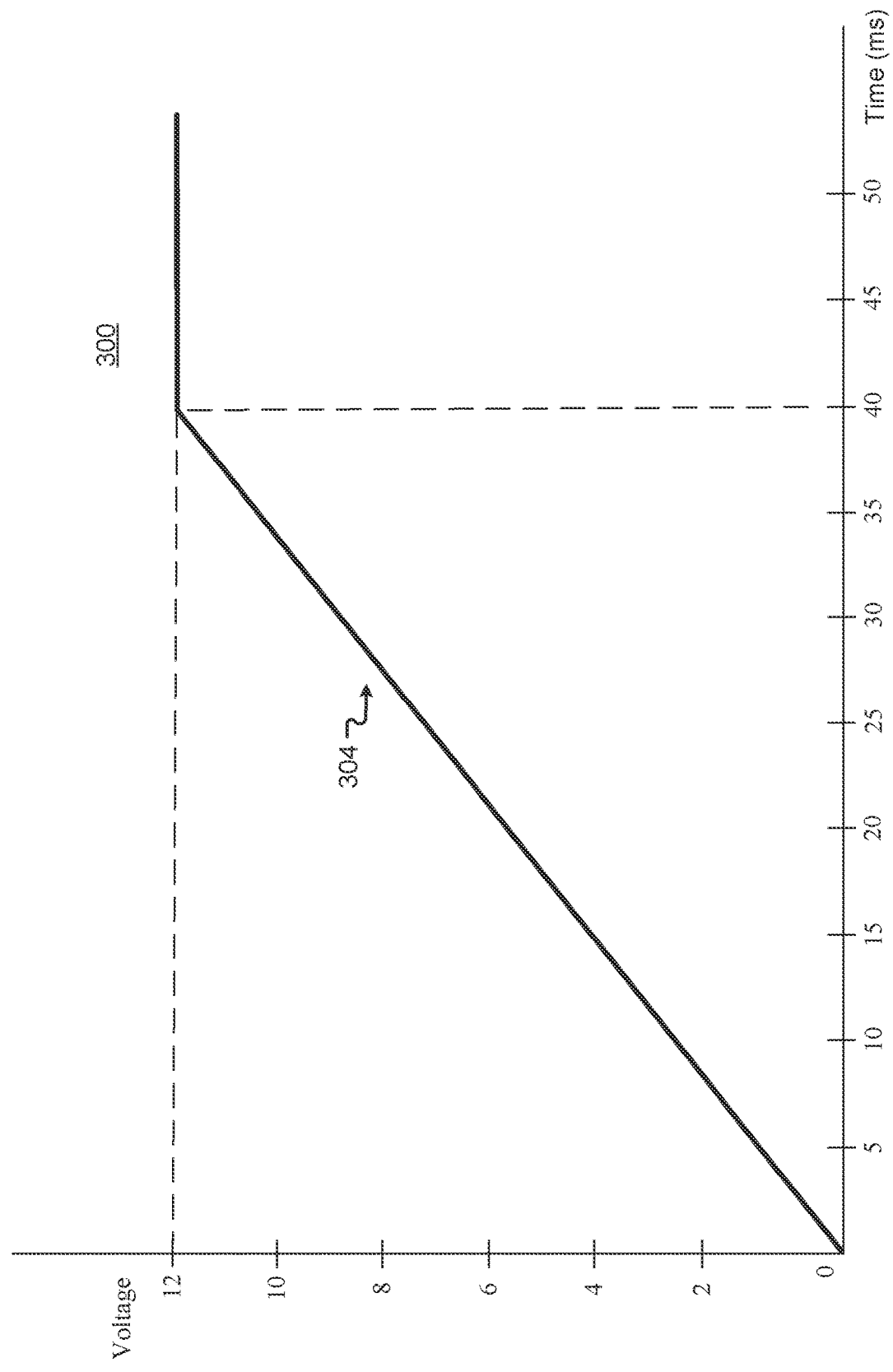
FIG. 3 is a graph of an exemplary waveform of the output voltage for a power supply incorporating an LLC topology requiring a controllable monotonic rising slope of the output voltage while preventing MOSFET hard switching of a body diode with inverse recovery current employing frequency modulation and duty cycle modulation control during the soft start-up operation according to an embodiment of the present disclosure.

FIG. 3 is a graph of an exemplary waveform of the output voltage for a power supply incorporating an LLC topology requiring a controllable monotonic rising slope of the output voltage while preventing MOSFET hard switching of a body diode with inverse recovery current employing frequency modulation and duty cycle modulation control during the soft start-up operation according to an embodiment of the present disclosure. The horizontal axis of the graph 300 denotes the time in milliseconds (ms) and the vertical axis of the graph 300 denotes the voltage in volts (V). The waveform 304 of the output voltage starts at 0V and increases to 12V in 40 ms. With the frequency modulation and duty cycle modulation control, the overall constant rising slope of the output voltage is achieved without any hard switching as discussed in greater detail below.

According to embodiments of the present disclosure, frequency modulation and duty cycle modulation control are provided for a controllable monotonic rising slope of the output voltage while preventing MOSFET hard switching of a body diode with inverse recovery current during the soft start-up operation for a power supply incorporating an LLC topology. Initially, the PWM mode is used with a relatively low frequency and the duty cycle increases from 0%. A maximum duty (Dmax) is limited based on the LLC resonant parameters and the output capacitance Coss of the MOSFET. The output capacitance Coss is defined as the sum of the capacitance from the drain to the source of the MOSFET and the capacitance from the gate to the drain of the MOSFET. The limited Dmax and the PWM frequency are selected to make sure the resonant power converter avoids hard switching duty cycle ranges for the body diodes of the MOSFETs.

When the duty cycle reaches limited Dmax, the frequency is switched to a highest target frequency and the duty cycle is switched to a value greater than limited Dmax at the same time. The on-time for the switching element is, however, kept the same as limited Dmax at the low frequency as discussed below.

FIG. 1 is a circuit diagram representing a schematic configuration of a power supply 100 including an LLC resonant converter topology according to one embodiment of the present disclosure. The LLC resonant converter illustrated in FIG. 1 can include most any topology, including, but not limited to, non-isolated and/or isolated topologies. In one example, the non-isolated topologies can comprise, but are not limited to, buck, boost, buck-boost, Ćuk, and/or charge pump converters, which are used for either step up or voltage inversion. In another example, the isolated topologies can comprise two-stage isolated bidirectional DC-DC converter, such as, but not limited to, fly-back, fly-forward, half bridge, full bridge and/or dual full bridge topologies.

The power supply 100 includes a power circuit 104 including two series connected MOSFET switching elements; high side ($Q_1$) and low side ($Q_2$) arranged in a half bridge configuration. The power circuit 104 also includes an input voltage source 108 providing a direct current (DC) input voltage $V_{IN}$ to the switching elements $Q_1$, $Q_2$. The power circuit 104 is configured to produce a unipolar square-wave voltage.

The power supply 100 also includes an output voltage 112 for providing a converted DC voltage as output voltage $V_{OUT}$, a resonant circuit 116, a transformer TX1, a rectification circuit 120, a filter circuit 124 and a load 128.

An input capacitor $C_1$ is coupled in parallel between the input voltage source 108 and the MOSFET switching elements $Q_1$, $Q_2$. Input capacitor $C_1$ acts as a filter for the input voltage $V_{IN}$ and buffers the energy. Moreover, input capacitor $C_1$ may act as a block capacitor connecting a power factor correction (PFC) circuit (not shown) to the LLC resonant converter, wherein the PFC circuit receives an alternating current commercial power from a current source (not shown). The transformer TX1 includes a primary winding $P_1$ coupled to the MOSFET switching elements $Q_1$, $Q_2$ via a magnetizing inductor $L_m$, split resonant capacitors $C_{R1}$ and $C_{R2}$ and a resonant inductor $L_r$ and a secondary winding $S_1$ coupled to the rectification circuit 120. The resonant inductor $L_r$, the split resonant capacitors $C_{R1}$ and $C_{R2}$ and the magnetizing inductor $L_m$ form the LLC resonant circuit 116. According to an alternative embodiment of the present disclosure, magnetizing inductor $L_m$ can be integrated with the primary winding $P_1$ of the transformer TX1 for circuit advantages without departing from the spirit and scope of the present disclosure. The split resonant capacitors $C_{R1}$ and $C_{R2}$ are used in medium-power and high-power applications to help reduce input current ripples. The filter circuit 124 includes a capacitor $C_2$ and the load 128 includes a resister R mounted in parallel to the filter circuit 124. The capacitor $C_2$ is provided to smooth the rectified voltage to the load 128 (R). The filter circuit 124 is mounted in parallel with the rectification circuit 120.

As illustrated in FIG. 1, the rectification circuit 120 includes four MOSFET switching elements $Q_3$, $Q_4$, $Q_5$, $Q_6$ arranged in a full bridge configuration to provide synchronous rectification. Alternatively, the rectification circuit 120 can include more or less switching devices if desired and/or be configured without synchronous rectification.

The power supply 100 of FIG. 1 includes one or more controllers such as isolator driver integrated circuit (IC) 150, digital signal processor (DSP)/microcontroller unit (MCU) 160 and driver IC 170 for generating control signals (e.g., pulse-width modulation (PWM) signals and pulse-frequency modulation (PFM) signals) for MOSFET switching elements $Q_1$, $Q_2$. As illustrated in FIG. 1, the control signal LLC driver H controls switching element $Q_1$ and the control signal LLC driver L controls switching element $Q_2$. The isolator driver IC 150, DSP/MCU 160 and the driver IC 170 also generate control signals (e.g., PWM signals) for the switching elements $Q_3$, $Q_4$, $Q_5$, $Q_6$ of the rectification circuit 120. The control signal SR driver H controls switching elements $Q_3$ and $Q_5$ and the control signal SR driver L controls switching elements $Q_4$ and $Q_6$.

The controller(s) of FIG. 1 can include one or more gate drive circuits and/or other suitable drive circuits to generate control signals. For example, the control circuit(s) can include gate drive transformers for generating control signals. In such examples, a gate drive transformer can generate a control signal for the switching element $Q_1$, a gate drive transformer can generate a control signal for the switching element $Q_2$, a gate drive transformer can generate control signals for the switching elements $Q_1$, $Q_2$ and/or a one more gate drive transformer(s) can generate control signals for the switching elements $Q_3$, $Q_4$, $Q_5$, $Q_6$.

The controller(s) 150, 160, 170 are adapted to vary the frequency of the control signals (e.g., LLC driver H, LLC driver L, SR driver H and SR driver L) and to vary the duty cycle to regulate the output voltage $V_{OUT}$. As illustrated in FIG. 1, the switching elements $Q_1$, $Q_2$ are shunt by their intrinsic body diodes $D_1$, $D_2$, respectively, and their intrinsic output capacitance $C_{oss1}$, $C_{oss2}$, respectively. For example, and as further explained below, the duty cycle and the frequency of the control signals provided to the switching element $Q_1$, $Q_2$ may be varied. Moreover, the MOSFET switching elements $Q_1$, $Q_2$ are turned ON and OFF, complimentary to each other according to a switching cycle (e.g., at a predetermined switching frequency and duty cycle) to drive the resonant circuit 116. As also illustrated in FIG. 1, the switching elements $Q_3$, $Q_4$, $Q_5$, $Q_6$ are shunt by their intrinsic body diodes $D_3$, $D_4$, $D_5$, $D_6$, respectively, and their intrinsic output capacitance $C_{oss3}$, $C_{oss4}$, $C_{oss5}$, $C_{oss6}$, respectively. The control signals having the varying parameters can assist in achieving a zero-voltage switching (ZVS) of the MOSFET switching elements $Q_1$, $Q_2$.

As explained below, the duty cycle of each control signal (LLC driver H, LLC driver L) can vary a set of duty cycle values. For example, and as further explained below, the duty cycle of control signal LLC driver H can vary depending on the output voltage $V_{OUT}$, the output current, the input voltage $V_{IN}$, the switching frequency, etc. According to one embodiment of the present disclosure, there are three states to the start-up process for the power supply. During the first state, the PWM mode is used. The PWM mode provides a relatively low frequency and the duty cycle for first and second signals (LLC driver H, LLC driver L) increase from 0 duty to a limited max duty (Dmax) value. This limited Dmax values is based on the LLC resonant parameters and the output capacitance Coss of the MOSFET switching elements $Q_1$, $Q_2$. With a correct limited Dmax value and PWM frequency selected, the LLC resonant converter avoids hard switching duty cycle ranges of the MOSFET switching elements $Q_1$, $Q_2$.

When the duty cycle reaches the limited Dmax value at state two, the PWM frequency is increased to a maximum target frequency. According to an embodiment of the present disclosure, the PWM frequency and the duty cycle are changed at the same time but the on-time for the switching elements stays the same. The on-time is the same as the limited Dmax at the lower frequency. Thus, a linear gain is produced.

For example, at state one, assume a PWM frequency is at 120 kHz. The duty cycle increases from 0% to a limited Dmax duty of 12%. With the frequency of 120 kHz and the limited Dmax duty of 12%, the on-time for the switching element is 1 microsecond. At state two the PWM frequency is increase to a maximum target frequency of 300 KHz while the duty cycle increases from Dmax to duty cycle of 30%. With the maximum target frequency of 300 kHz and the duty cycle of 30%, the on-time for the switching element is still 1 microsecond.

At state three, based on the feedback control loop (e.g., the output voltage $V_{OUT}$) the on-time for the switching element can increase or decrease but certain duty cycle ranges can be avoiding by oscillating the frequency back and forth (e.g., 120 kHz and 300 kHz). Once the on-time increase to ½ period (at the highest target frequency), pulse frequency modulation (PFM) mode is enacted. During the PFM mode, the amplitude and the width of the pulses are kept constant while the frequency is varied.

Figure 4A:
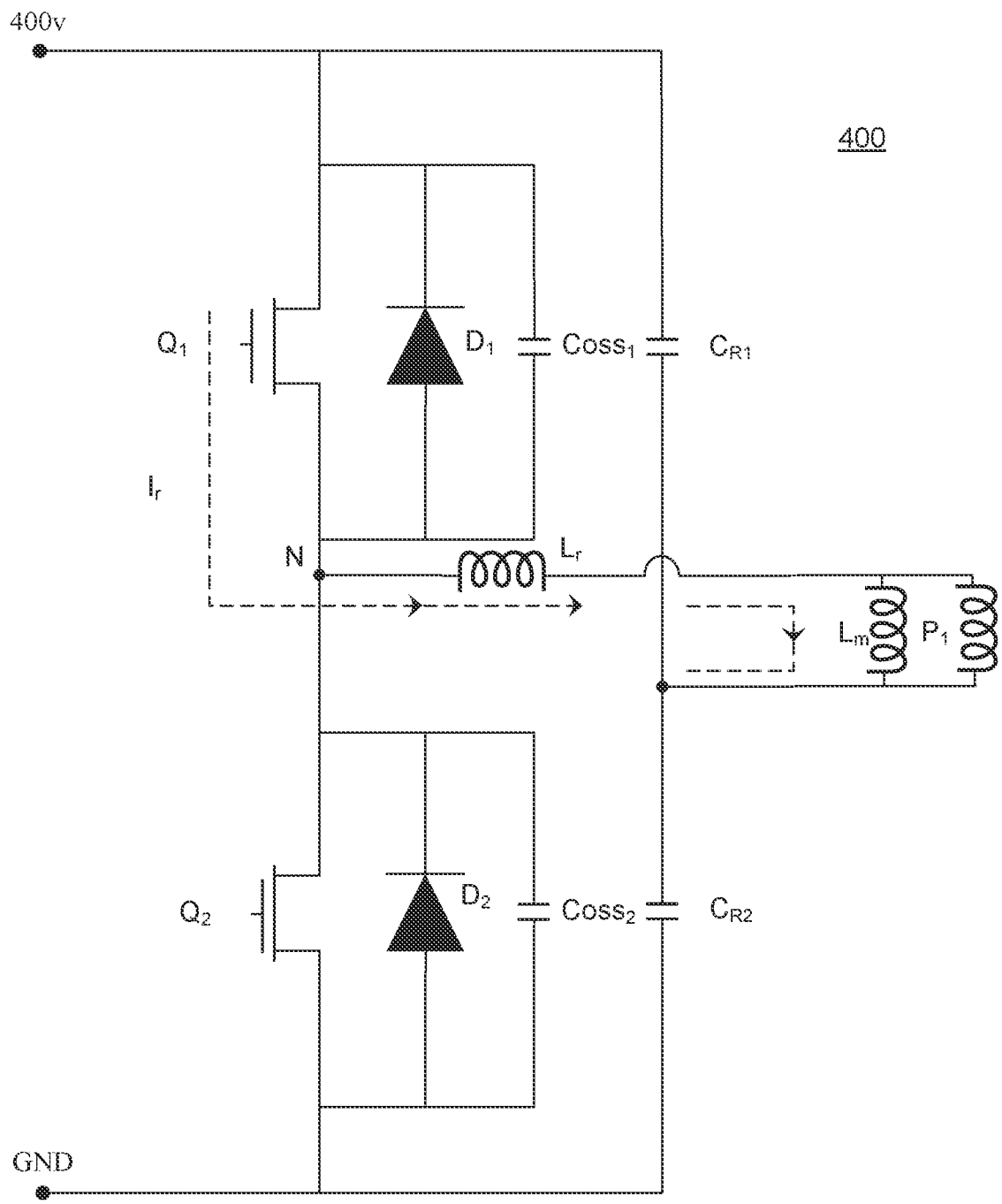
FIGS. 4A-AE illustrate the current paths in the power supply incorporating an LLC topology requiring a controllable monotonic rising slope of the output voltage while preventing MOSFET hard switching of a body diode with inverse recovery current of FIG. 1 according to embodiments of the present disclosure.

FIGS. 4A-AE illustrate the current paths in the power supply incorporating an LLC topology requiring a controllable monotonic rising slope of the output voltage while preventing MOSFET hard switching of a body diode with inverse recovery current of FIG. 1 according to embodiments of the present disclosure. In FIGS. 4A-4E there are shown a resonant inductor $L_r$ connected between the primary winding $P_1$ and the magnetizing inductor $L_m$ and body diodes $D_1$ and $D_2$ of the switching elements $Q_1$, $Q_2$. Resonant capacitor $C_{R1}$ is provided between the drain and source of the switching element $Q_1$ and resonant capacitor $C_{R2}$ is provide between the drain and source of the switching element $Q_2$. Output capacitances $C_{oss1}$, $C_{oss2}$ are provided. The input voltage $V_{IN}$ here is, for example, 400 V.

As shown in FIG. 4A at a first stage 400, when the switching elements $Q_1$, $Q_2$ are turned ON and OFF, respectively, the resonant current $I_r$ flows through the switching element $Q_1$, the connection node N, the resonant inductor $L_r$, and the magnetizing inductor $L_m$ in this order. The current also energizes primary winding $P_1$ in which power is delivered to the transformer TX1 and in turn to the power supply's output. Here the switching voltage is 400V.

Figure 4B:
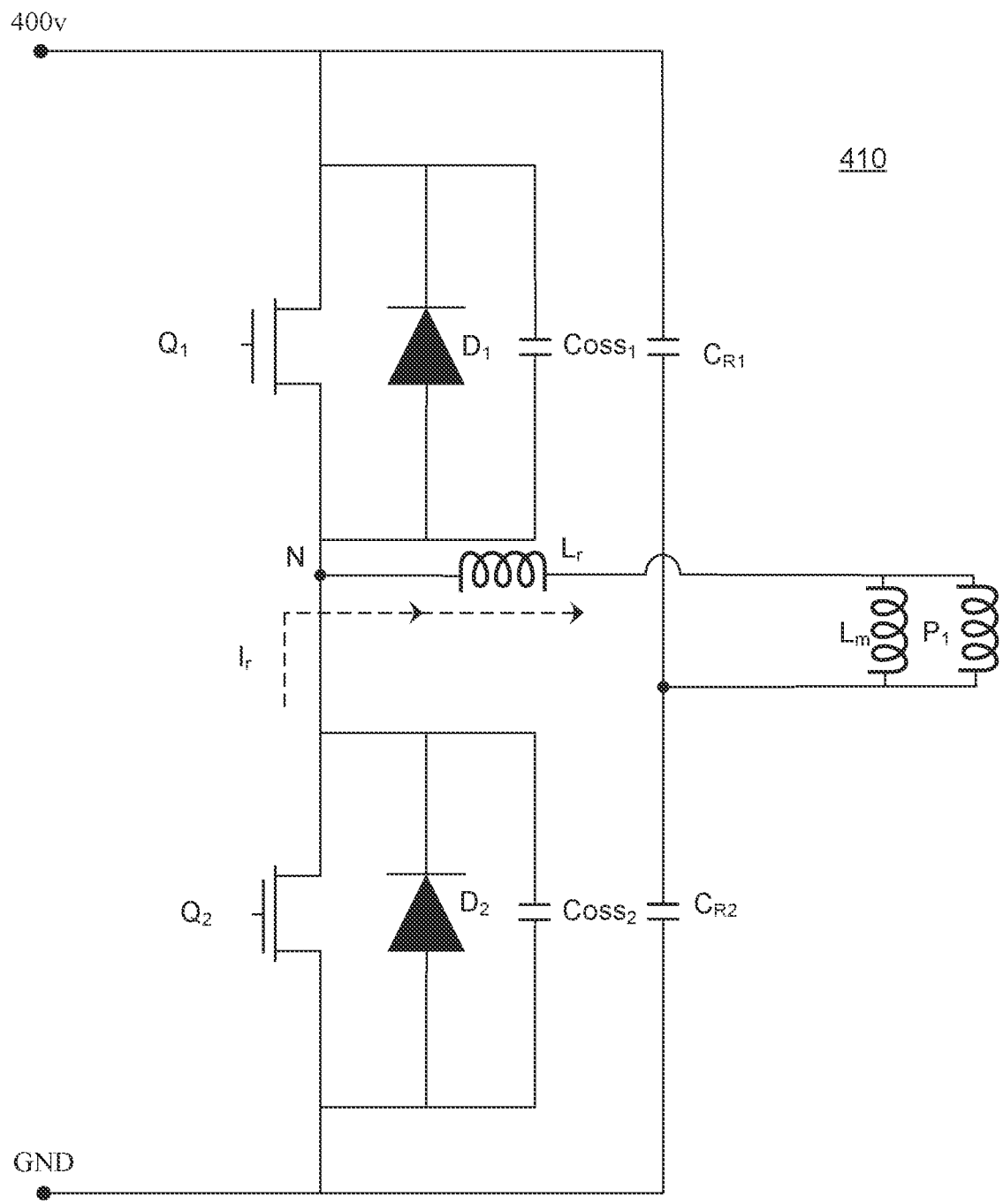

As shown in FIG. 4B at a second stage 410, when the switching elements $Q_1$, $Q_2$ both just turned OFF, the resonant current $I_r$ will not go to zero immediately. In other words, the resonant current $I_r$ does not instantaneously go away and a positive current flows through the lower half of the resonant tank (e.g., the positive current will flow from the resonant capacitor $C_{R1}$, through the body diode $D_2$ of the switching element $Q_2$ towards the connection node N). Here the discharging of output capacitor $C_{oos2}$ begins and the switching voltage starts to fall. Moreover, the voltage across $Q_2$ goes to zero. At this point, if $Q_2$ is turned ON, and the switch voltage reaches zero 0V, ZVS (soft switching) would be achieved. The duty cycle, however, is small and Q2 cannot not be turned ON at this point since $Q_1$'s period has not ended.

Figure 4C:
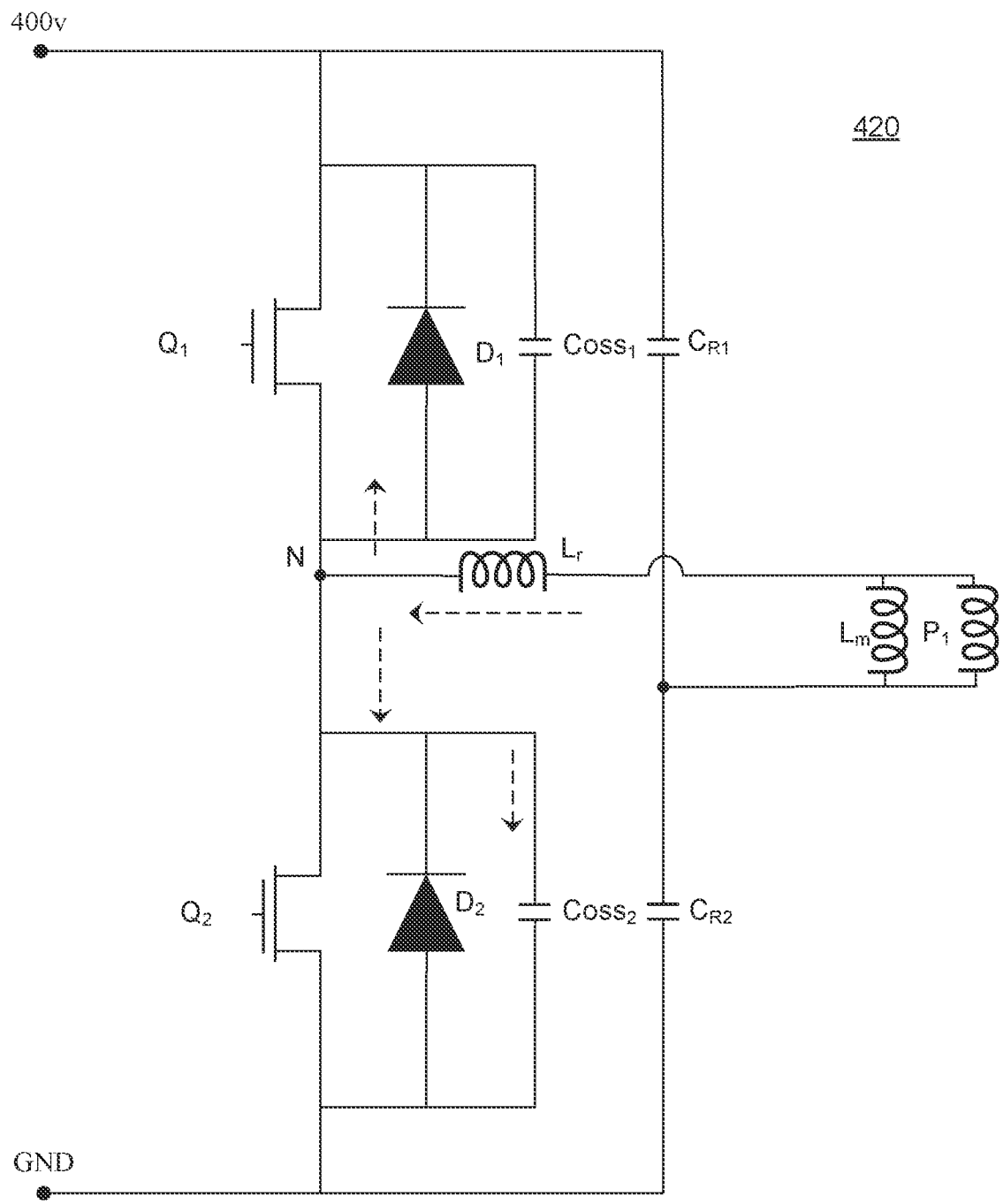

As shown in FIG. 4C at a third stage 420, when the switching elements $Q_1$, $Q_2$ are both still turned OFF, the resonant current $I_r$ in the positive direction ends and the current flows in the negative direction (e.g., since the duty cycle is small, there is not enough energy in the LLC tank). The negative current will charge the output capacitance $C_{oos2}$. Charging the output capacitance $C_{oos2}$ will prevent ZVS if $Q_2$ is turned ON at this point. Moreover, if there is enough energy, the negative current will charge the body diode $D_1$ of switching element $Q_1$. In other words, when the voltage at the connection node N is greater than 400V, body diode $D_1$ conducts and this makes $Q_1$ conductive. If $Q_2$ is turned ON at the third stage, it is dangerous and results in hard switching. $D_1$ is OFF and there is recovery current. $D_1$ and $Q_2$ are shorted. The voltage of $Q_2$ with respect to time is too large and this will damage $Q_2$. If $Q_2$ is not turned ON at the third stage and the process moves to stage 4.

Figure 4D:
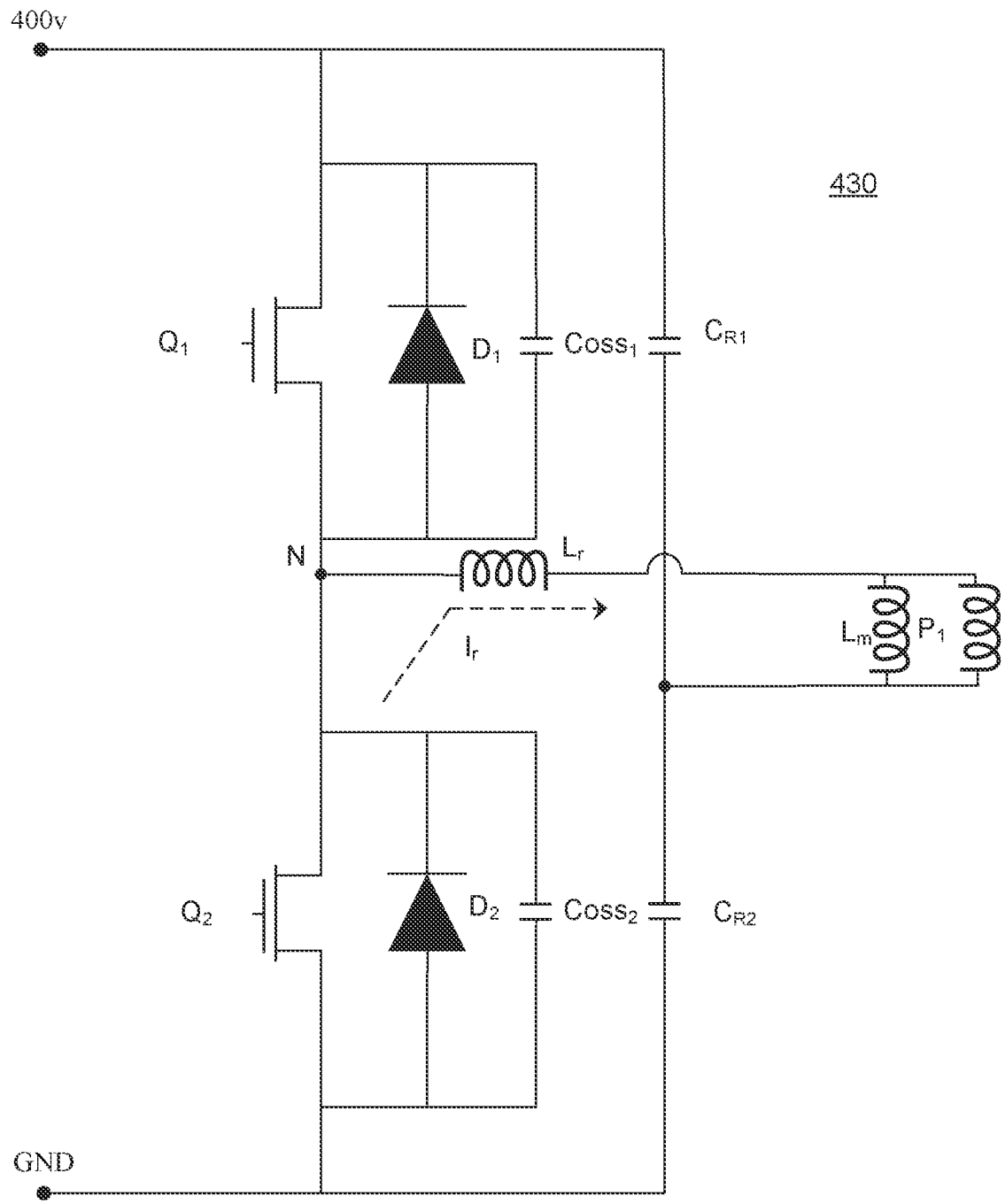
Figure 4E:
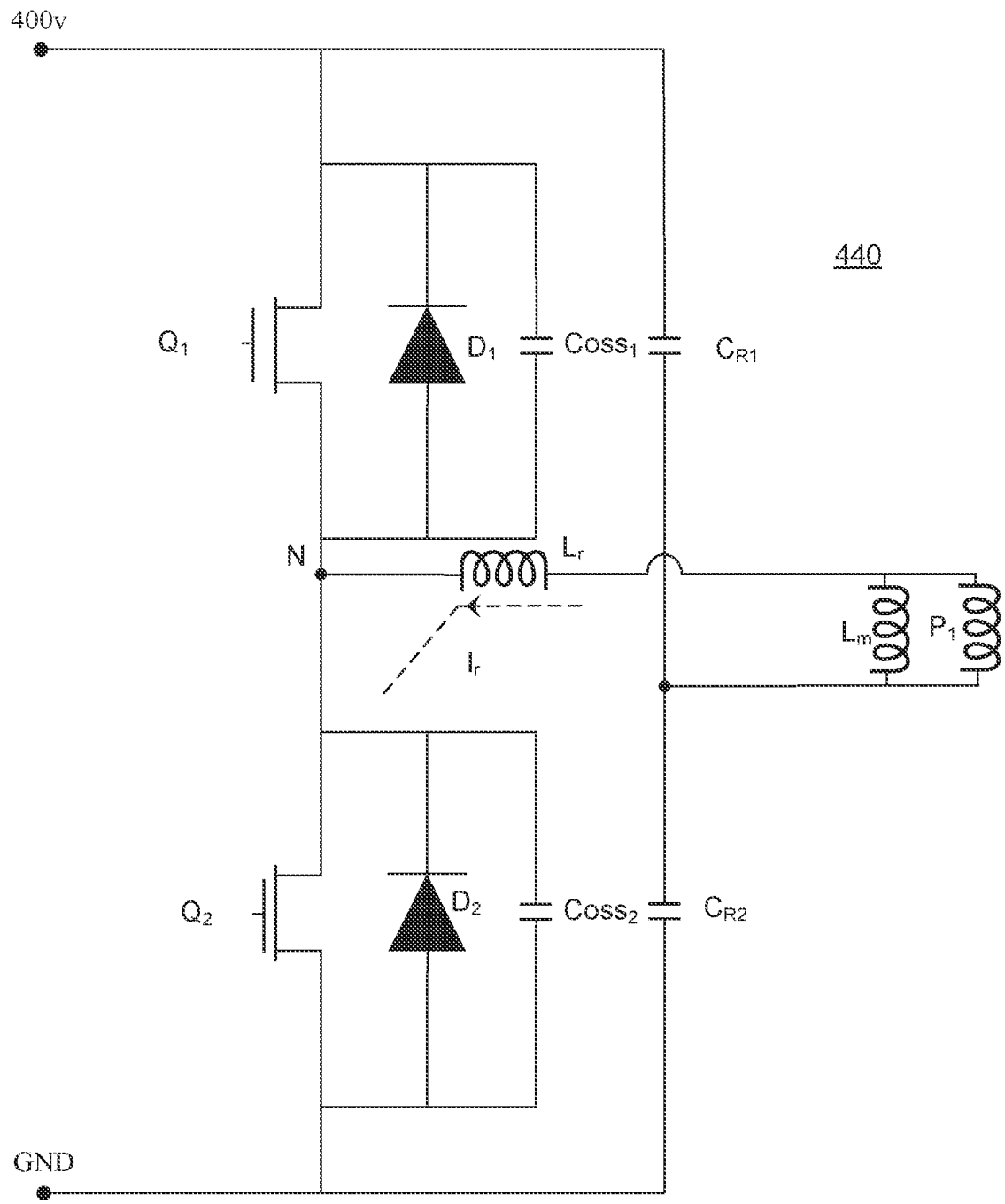

As shown in FIG. 4D at a fourth stage 430, when the switching elements $Q_1$, $Q_2$ are still both turned OFF, a resonant current $I_r$ in the positive direction flow through the LLC tank. Likewise, as shown in FIG. 4E at a fifth stage 440, when the switching elements $Q_1$, $Q_2$ are both still turned OFF, a resonant current $I_r$ in the negative direction flows through the LLC tank.

Figure 5:
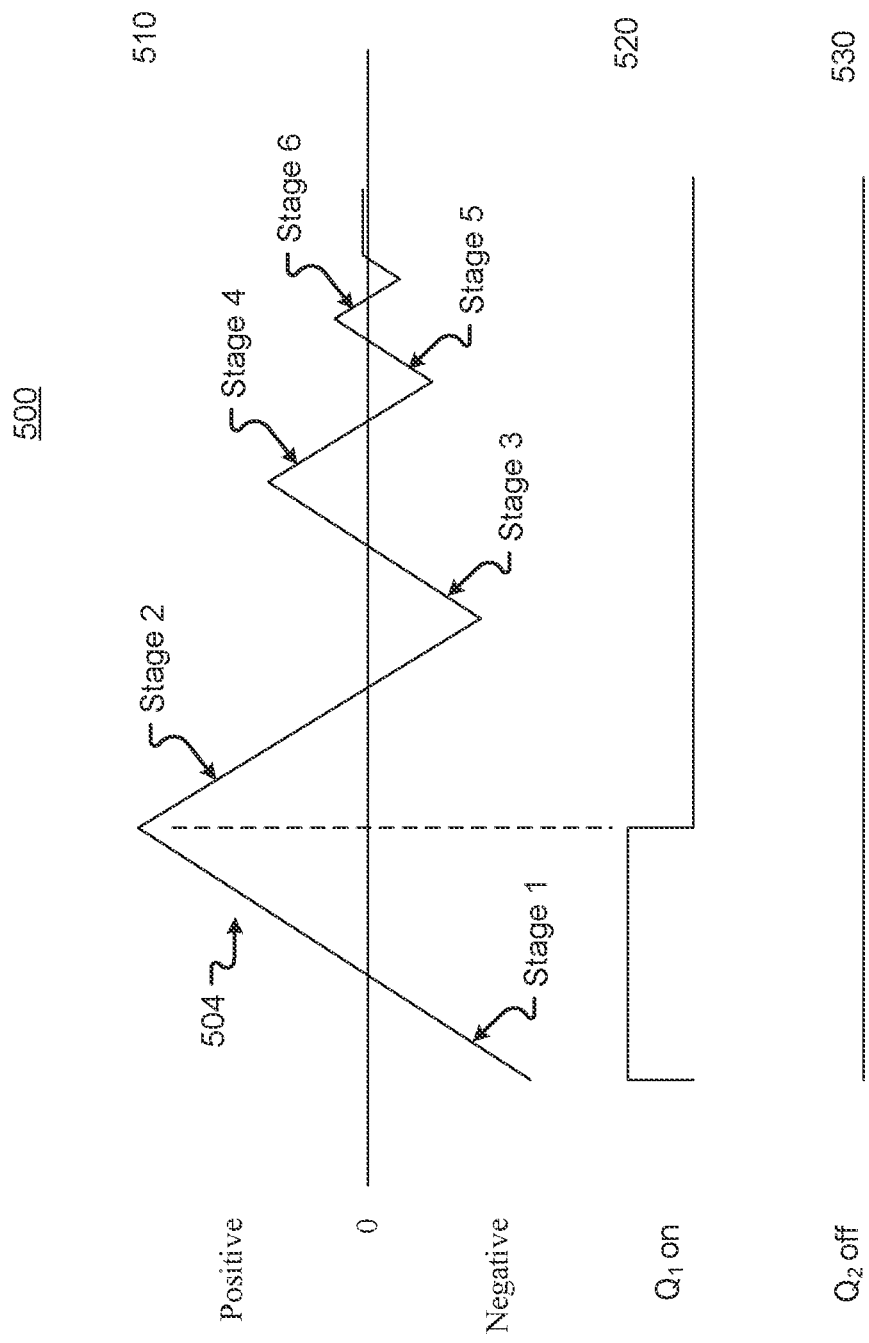
FIG. 5 illustrates a graph of the primary current and timing diagrams for the control signals of the switching elements provided to the power supply incorporating an LLC topology requiring a controllable monotonic rising slope of the output voltage while preventing MOSFET hard switching of a body diode with inverse recovery current of FIG. 1 according to one embodiment of the present disclosure.

FIG. 5 illustrates a graph of the primary current and timing diagrams for the control signals of the switching elements provided to the power supply incorporating an LLC topology requiring a monotonic rising slope of the output voltage while preventing MOSFET hard switching of a body diode with inverse recovery current of FIG. 1 according to one embodiment of the present disclosure. Graph 510 is a plot of the primary current 504 at stages 1-6. At stage 1, switch element $Q_1$ is turned ON and switching element $Q_2$ is OFF as illustrating in timing diagrams 520 and 530. At stage 2, switching element $Q_1$ and switching element $Q_2$ are both turned OFF as illustrated in timing diagrams 520 and 530. The primary current 504 is positive. At stage 3, switching element $Q_1$ and switching element $Q_2$ are both turned OFF as illustrated in timing diagrams 520 and 530. The primary current 504 is negative. At stage 4, switching element $Q_1$ and switching element $Q_2$ are both turned OFF as illustrated in timing diagrams 520 and 530. The primary current 504 is negative. At stage 5, switching element $Q_1$ and switching element $Q_2$ are both turned OFF as illustrated in timing diagrams 520 and 530. The primary current 504 is negative. At stage 6, switching element $Q_1$ and switching element $Q_2$ are both turned OFF as illustrated in timing diagrams 520 and 530. The primary current 504 is positive. According to the above, it is safe to turn on switching element $Q_2$ at stages 2, 4, 5 and 6, but not at stage 3.

According to embodiments of the present disclosure, during the PWM mode, if duty cycle is small, for example less than 12%, then the resonant current will die out and the resonant energy will only charge the output capacitor (parasitic capacitor) Coss, but the resonant current would not be great enough to conduct the reverse body diode of MOSFET. Therefore, it will be safe to turn on Q2. However, when the duty cycle gets larger, the risk of hard switching will increase. Therefore, according to embodiments of the present disclosure, the frequency jumps to a higher frequency to avoid the risk of hard switching at certain duty cycle ranges.

Figure 6A:
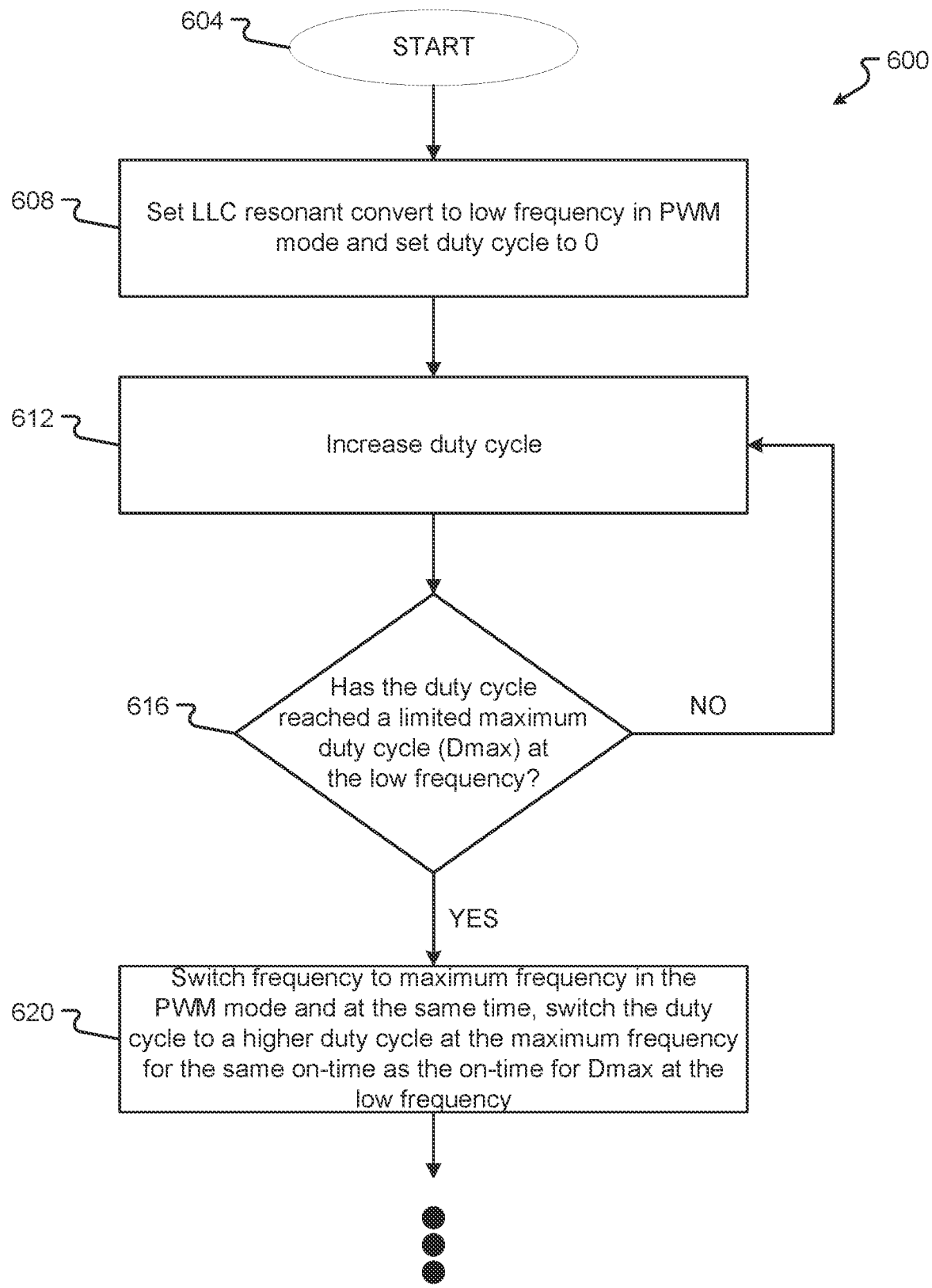
FIGS. 6A and 6B illustrate a flowchart of a method for a soft start-up operation of a power supply incorporating an LLC topology requiring a controllable monotonic rising slope of the output voltage while preventing MOSFET hard switching of a body diode with inverse recovery current of FIG. 1 in accordance with embodiments of the present disclosure.
Figure 6B:
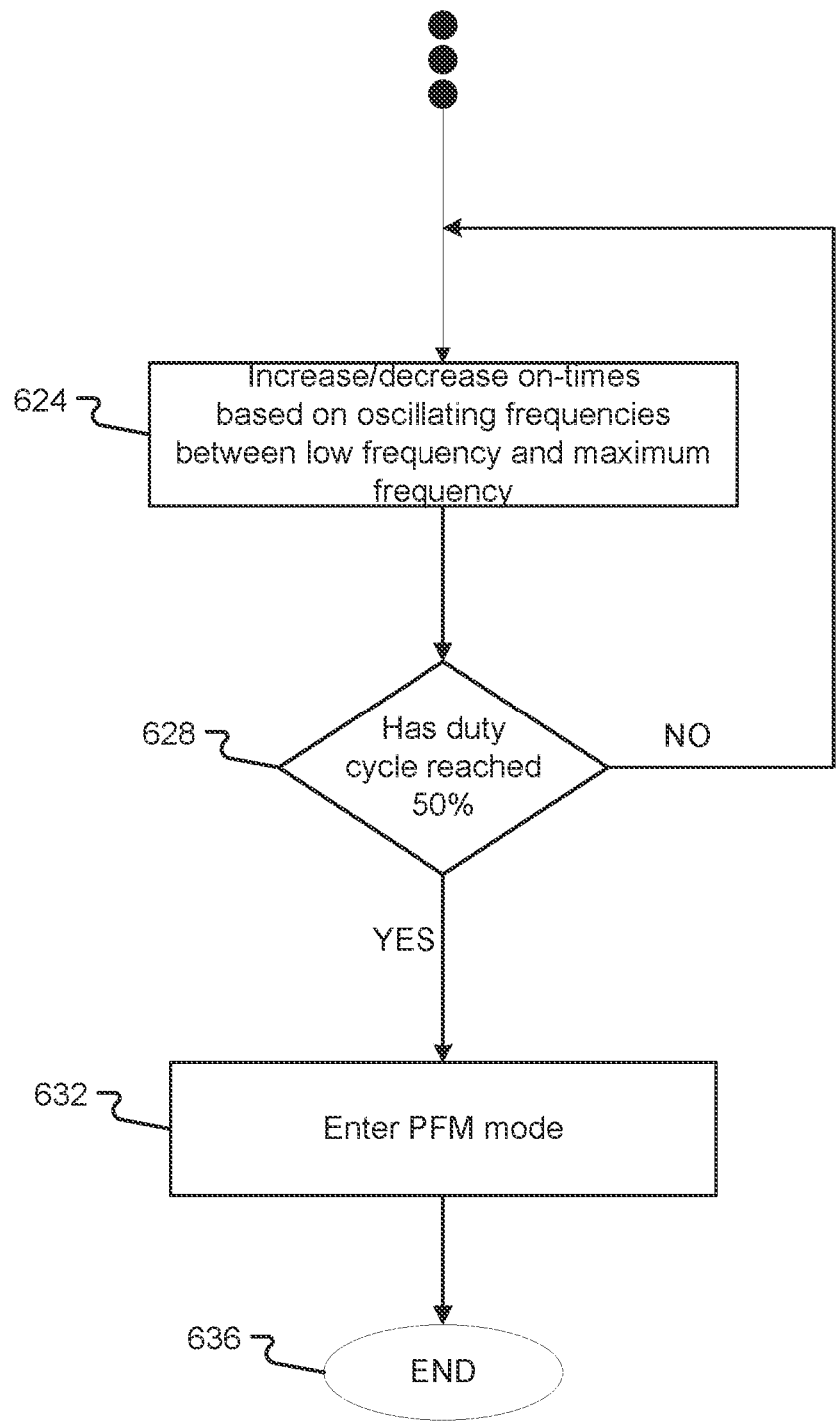

FIGS. 6A and 6B illustrate a flowchart of a method for a soft start-up operation of a power supply with an LLC topology requiring monotonic rising of the output voltage while preventing MOSFET hard switching in accordance with embodiments of the present disclosure. While a general order for the steps of the method 600 for the soft start-up operation is show in FIGS. 6A and 6B, the method 600 can include more or fewer steps or can arrange the order of the steps differently than those shown in FIGS. 6A and 6B. Further, two or more steps may be combined into one step. Generally, the method 600 starts with a START operation 604 and ends with an END operation 636. The method can be executed on a set of computer-executable instructions executed by a data processing system and encoded or stored on a computer readable medium. Herein, the method 600 shall be explained with reference to systems and components, modules, software, data structures, user interfaces, etc. described above.

Method 600 may start at START operation 604 and proceed to step 608 where the controller provides control signals to set low frequency in the PWM mode and set the duty cycle to 0. After the low frequency in the PWM mode is set and the duty cycle is set to 0 at step 608, method 600 proceeds to step 612, where the controller increases the duty cycle. The duty cycle is increase based on the feedback look from the output voltage $V_{OUT}$. After the duty cycle is increased as step 612, method 600 proceed to decision step 616 where the controller determines if the duty cycle has reached a limited maximum duty cycle (Dmax) at the low frequency. If the duty cycle has not reached (Dmax) at the low frequency at decision step 616 (NO), method 600 returns the step 612 where the controller increases the duty cycle. If the duty cycle has reached (Dmax) at the low frequency at decision step 616 (YES), method 600 proceeds to step 620 where the controller switches the frequency to a maximum frequency in the PWM mode and at the same time, switches the duty cycle to a higher duty cycle (i.e., higher than Dmax at the low frequency) for the maximum frequency for the same on-time as the on-time for Dmax at the low frequency.

After switching the frequency to a maximum frequency in the PWM mode and at the same time, switching the duty cycle to a higher duty cycle for the maximum frequency for the same on-time as the on-time for Dmax at the low frequency at step 620, method 600 proceeds to decision step 624, where the controller increases or decreases the on-time based on oscillating frequencies between the low frequency and the maximum frequency. During this process, however, certain duty cycle ranges are avoided to prevent MOSFET hard switching. After the on-times have been increased or decreased based on oscillating the frequencies between Dmax and the maximum frequency at step 628, method 600 proceeds to decision step 632, where the controller determines if the duty cycle has reached 50%. If the duty has not reached 50% at decision step 632 (NO), method 600 returns to step 628 where the on-times increase or decrease based on the oscillating frequencies.

If the duty has reached 50% at decision step 632 (YES), method 600 proceeds to step 636 where the controller determines that the LLC resonant converter has entered the PFM mode. After the LLC resonant converter enters the PFM mode at step 636, method 600 proceeds to END operation 648 where method 600 may end.

Figure 7:
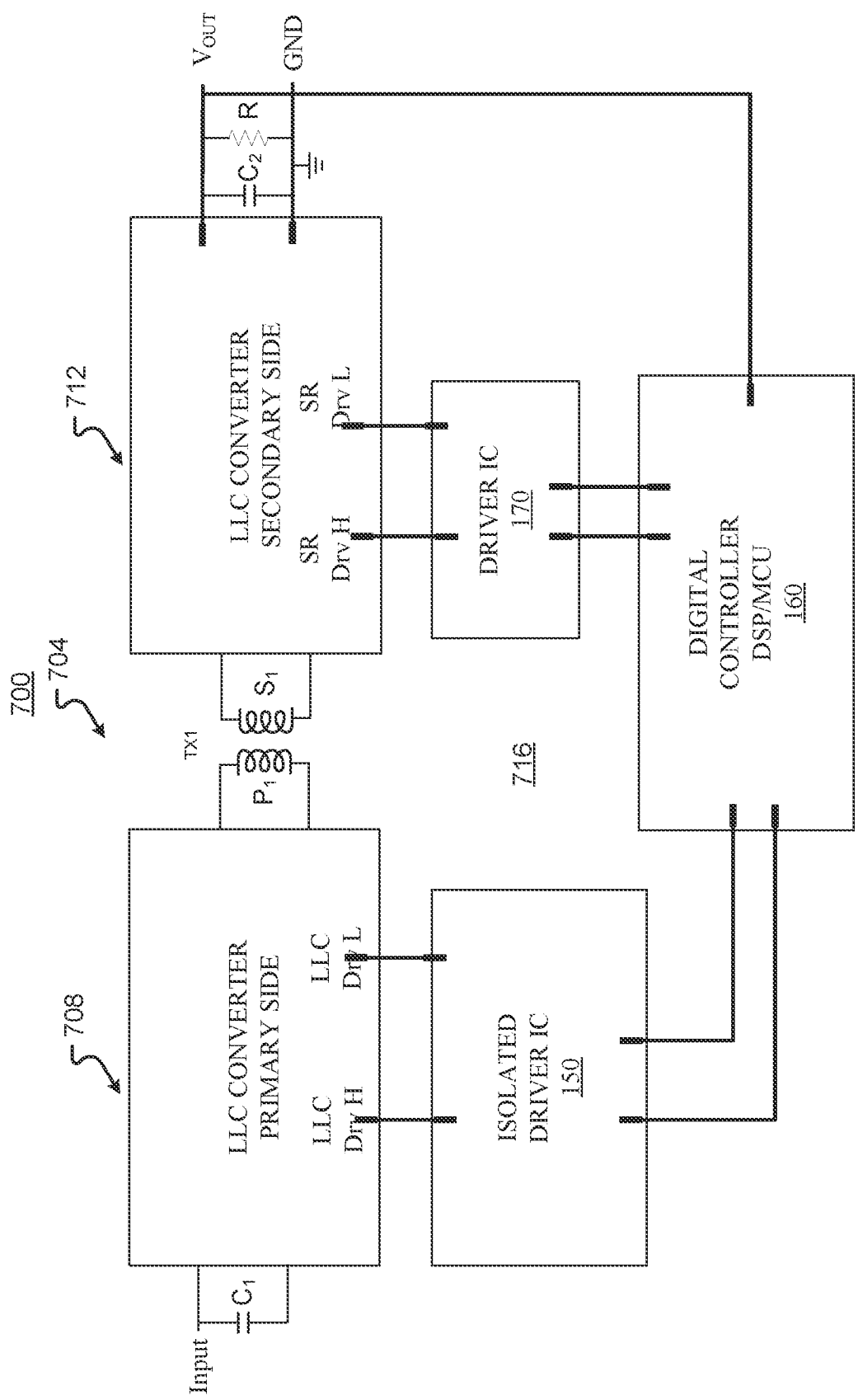
FIG. 7 is a block diagram of the circuit representing a schematic configuration of a power supply incorporating an LLC topology requiring a controllable monotonic rising slope of the output voltage while preventing MOSFET hard switching of a body diode with inverse recovery current of FIG. 1 according to one embodiment of the present disclosure.

FIG. 7 is a block diagram of the circuit representing a schematic configuration of a power supply 700 incorporating an LLC topology requiring a controllable monotonic rising slope of the output voltage while preventing MOSFET hard switching of a body diode with inverse recovery current coupled with a digital controller of FIG. 1 according to one embodiment of the present disclosure. The power supply 700 includes an LLC converter 704 having the transformer TX1 coupled between an LLC converter primary side 708 and an LLC converter secondary side 712. Similar to the power supply 100 of FIG. 1, two switching elements are arranged in a half bridge configuration on the LLC converter primary side 708 of FIG. 7 and a rectification circuit having four switching devices is positioned on the LLC converter secondary side 712 of FIG. 7.

Additionally, the power supply 700 includes a digital control circuit 716 having an isolated driver IC 150, a digital controller DSP/MCU 160 and a driver IC 170. The digital control circuit 716 can vary the duty cycle and the frequency of control signals provided to the switching elements on the LLC converter primary side 708 as explained above. As shown in FIG. 7, the digital controller DSP/MCU 160 senses an output voltage $V_{OUT}$ and current and provides signals to driver the isolated driver IC 150 and the driver IC 170.

Specifically, and as shown in FIG. 7, signals LLC driver H and LLC driver L are provided to the isolated driver IC 150 and signals SR driver H and SR driver L are provided to driver IC 170. The isolated driver 1C 150 generates control signals for the switching elements on the LLC converter primary side 708 based on the signals from the digital controller DSP/MCU160. Similarly, the driver IC 170 generates control signals for the switching elements on the LLC converter secondary side 712 based on the signals from the digital controller DSP/MU 160.

Any of the steps, functions, and operations discussed herein can be performed continuously and automatically.

The exemplary devices, systems and methods of this disclosure have been described in relation to an LLC resonant converter. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a power supply having a resonant topology. The power supply incudes a switching circuit, a resonant circuit, a rectification circuit and a controller. The switching circuit including a plurality of switches, an input and an output. The input is coupled to an input voltage source. The resonant circuit is coupled between the output of the switching circuit. The rectification circuit is coupled between the resonant circuit and an output of the power supply. The controller is coupled to the switching circuit and configured to, during a soft start-up operation of the power supply, switch the plurality of switches with a duty cycle of a variable limited maximum duty cycle at a frequency of a minimum frequency in a pulse frequency modulation (PWM) mode. The controller is further configured to, after the variable limited maximum duty cycle reaches the limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The controller is further configured to, after the duty cycle at the maximum frequency reaches a value of 0.5, enter a pulse frequency modulation (PFM) mode.

Aspects of the above power supply having a resonant topology include the controller is configured to switch the frequency between the minimum frequency and the maximum frequency based on the output of the power supply.

Aspects of the above power supply having a resonant topology include the plurality of switches is in a half-bridge configuration.

Aspects of the above power supply having a resonant topology include the resonant circuit includes an inductor-inductor-capacitor topology.

Aspects of the above power supply having a resonant topology include the capacitor is a split capacitor.

Aspects of the above power supply having a resonant topology include the rectification circuit includes a plurality of switches.

Aspects of the above power supply having a resonant topology include the plurality of switches is in a full bridge configuration.

Aspects of the above power supply having a resonant topology include the plurality of switches includes metal-oxide-semiconductor field-effect transistor (MOSFET)s.

Aspects of the above power supply having a resonant topology include the controller is configured to control the plurality of switches to achieve zero voltage switching (ZVS) of the plurality of switches.

Embodiments include a method of operating a power supply having a resonant topology. The method includes determining a minimum frequency for a frequency and a limited maximum duty cycle for a variable duty cycle at which to provide drive signals in response to a feedback signal in a pulse width modulation (PWM) mode. The method also includes, after the limited maximum duty cycle has been reaches at the minimum frequency, simultaneously switching the frequency to a maximum frequency and switching the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The method further includes after the duty cycle at the maximum frequency reaches a value of 0.5, enter a pulse frequency modulation (PFM) mode.

Aspects of the above method of operating a power supply having a resonant topology include switching the frequency between the minimum frequency and the maximum frequency based on the feedback signal.

Embodiments include an apparatus. The apparatus includes a switching circuit, a resonant circuit coupled to an output of the switching circuit, a rectification circuit coupled between the resonant circuit and an output of the apparatus and a controller. The controller is coupled to the switching circuit and is configured to, during a soft start-up operation of the power supply, switch a plurality of switches of the switch circuit with a duty cycle of a variable limited maximum duty cycle at a frequency of a minimum frequency in a pulse frequency modulation (PWM) mode. The controller is also configured to, after the variable limited maximum duty cycle reaches the limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency. The minimum duty cycle at the maximum frequency is greater than the limited maximum duty cycle at the minimum frequency. The controller is further configured to, after the duty cycle at the maximum frequency reaches a value of 0.5, enter a pulse frequency modulation (PFM) mode.

Aspects of the above apparatus include the controller is configured to switch the frequency between the minimum frequency and the maximum frequency based on the output of the apparatus.

Aspects of the above apparatus include the plurality of switches is in a half-bridge configuration.

Aspects of the above apparatus include the resonant circuit includes an inductor-inductor-capacitor topology.

Aspects of the above apparatus include the capacitor is a split capacitor.

Aspects of the above apparatus include the rectification circuit includes a plurality of switches.

Aspects of the above apparatus include the plurality of switches is in a full bridge configuration.

Aspects of the above apparatus include the plurality of switches includes metal-oxide-semiconductor field-effect transistor (MOSFET)s.

Aspects of the above apparatus include the controller is configured to control the plurality of switches to achieve zero voltage switching (ZVS) of the plurality of switches.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A power supply having a resonant topology, comprising:
   a switching circuit comprising:
      a plurality of switches;
      an input; and
      an output,
      wherein the input is coupled to an input voltage source;
   a resonant circuit coupled between the output of the switching circuit;
   a rectification circuit coupled between the resonant circuit and an output of the power supply; and
   a controller coupled to the switching circuit configured to, during a soft start-up operation of the power supply:
      switch the plurality of switches with a duty cycle of a variable limited maximum duty cycle at a frequency of a minimum frequency in a pulse width modulation (PWM) mode;
      after the variable limited maximum duty cycle reaches a limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency,
      wherein the minimum duty cycle at the maximum frequency is greater than the limited maximum duty cycle at the minimum frequency; and
      after the duty cycle at the maximum frequency reaches a value of 0.5, enter a pulse frequency modulation (PFM) mode.

2. The power supply according to claim 1, wherein the controller is configured to switch the frequency between the minimum frequency and the maximum frequency based on the output of the power supply.

3. The power supply according to claim 1, wherein the plurality of switches is in a half-bridge configuration.

4. The power supply according to claim 1, wherein the resonant circuit includes an inductor-inductor-capacitor topology.

5. The power supply according to claim 4, wherein a capacitor in the inductor-inductor-capacitor topology is a split capacitor.

6. The power supply according to claim 1, wherein the rectification circuit includes a plurality of switches.

7. The power supply according to claim 6, wherein the plurality of switches is in a full bridge configuration.

8. The power supply according to claim 1, wherein the plurality of switches includes metal-oxide-semiconductor field-effect transistor (MOSFET)s.

9. The power supply according to claim 1, wherein the controller is configured to control the plurality of switches to achieve zero voltage switching (ZVS) of the plurality of switches.

10. A method of operating a power supply having a resonant topology, comprising:
    determining a minimum frequency for a frequency and a limited maximum duty cycle for a variable duty cycle at which to provide drive signals in response to a feedback signal in a pulse width modulation (PWM) mode;
    after the limited maximum duty cycle has been reached at the minimum frequency, simultaneously switching the frequency to a maximum frequency and switching a duty cycle to a minimum duty cycle at the maximum frequency for a same on-time as the limited maximum duty cycle at the minimum frequency,
    wherein the minimum duty cycle at the maximum frequency is greater than the limited maximum duty cycle at the minimum frequency; and
    after the duty cycle at the maximum frequency reaches a value of 0.5, enter a pulse frequency modulation (PFM) mode.

11. The method according to claim 10, further comprising switching the frequency between the minimum frequency and the maximum frequency based on the feedback signal.

12. An apparatus, comprising:
    a switching circuit;
    a resonant circuit coupled to an output of the switching circuit;
    a rectification circuit coupled between the resonant circuit and an output of the apparatus; and
    a controller coupled to the switching circuit configured to, during a soft start-up operation of a power supply:
       switch a plurality of switches of the switch circuit with a duty cycle of a variable limited maximum duty cycle at a frequency of a minimum frequency in a pulse width modulation (PWM) mode;
       after the variable limited maximum duty cycle reaches a limited maximum duty cycle at the minimum frequency, simultaneously switch the frequency to a maximum frequency and switch the duty cycle to a minimum duty cycle at the maximum frequency for a same on-time as the limited maximum duty cycle at the minimum frequency,
       wherein the minimum duty cycle at the maximum frequency is greater than the limited maximum duty cycle at the minimum frequency; and
       after the duty cycle at the maximum frequency reaches a value of 0.5, enter a pulse frequency modulation (PFM) mode.

13. The apparatus according to claim 11, wherein the controller is configured to switch the frequency between the minimum frequency and the maximum frequency based on the output of the apparatus.

14. The apparatus according to claim 12, wherein the plurality of switches is in a half-bridge configuration.

15. The apparatus according to claim 12, wherein the resonant circuit includes an inductor-inductor-capacitor topology.

16. The apparatus according to claim 15, wherein a capacitor in the inductor-inductor-capacitor topology is a split capacitor.

17. The apparatus according to claim 12, wherein the rectification circuit includes a plurality of switches.

18. The apparatus according to claim 17, wherein the plurality of switches is in a full bridge configuration.

19. The apparatus according to claim 12, wherein the plurality of switches includes metal-oxide-semiconductor field-effect transistor (MOSFET)s.

20. The apparatus according to claim 12, wherein the controller is configured to control the plurality of switches to achieve zero voltage switching (ZVS) of the plurality of switches.

* * * * *